United States Patent [19]

Sunter

[11] Patent Number: 4,491,458
[45] Date of Patent: Jan. 1, 1985

[54] METHOD FOR DETECTING AN OVERLOAD OF A FABRIC FILTER

[75] Inventor: Thomas C. Sunter, Wellsville, N.Y.

[73] Assignee: The Air Preheater Company, Inc., Wellsville, N.Y.

[21] Appl. No.: 479,600

[22] Filed: Mar. 28, 1983

[51] Int. Cl.³ .............................................. B01D 46/04
[52] U.S. Cl. .......................................... 55/21; 55/96; 55/274; 55/283; 55/284
[58] Field of Search ...... 55/21, 96, 274, 283, 55/284, 287, 288, 302, 352

[56] References Cited

U.S. PATENT DOCUMENTS

| 2,576,656 | 11/1951 | Wallin | 55/283 X |
| 2,633,206 | 3/1953 | Bruckner | 55/283 X |
| 3,027,865 | 4/1962 | Kautz et al. | 55/274 X |
| 4,121,199 | 10/1978 | Young | 55/274 X |
| 4,277,255 | 7/1981 | Apelgren | 55/21 X |

FOREIGN PATENT DOCUMENTS 2512088  9/1975  Fed. Rep. of Germany ........ 55/274

Primary Examiner—Charles Hart
Attorney, Agent, or Firm—William W. Habelt

[57] ABSTRACT

An improved method of cleaning a fabric filter collector (10) housing one or more filter chambers (12) wherein the cleaning operation is monitored to actuate an alarm (54) if the pressure differential across the collector after any particular cleaning operation exceeds the pressure differential across the collector at initiation of that cleaning operation.

3 Claims, 2 Drawing Figures

METHOD FOR DETECTING AN OVERLOAD OF A FABRIC FILTER

BACKGROUND OF THE INVENTION

The present invention relates to the filtering of a gas stream for the removal of particulate matter entrained therein via a fabric filter, and more particularly, to a method for detecting the existence of an overload of the fabric filter due to the accumulation of particulate matter collecting on the fabric filter.

One highly successful technique for separating undesirable particulate matter from a gas stream laden with particulate matter is fabric filtration. Such filtration is typically carried out in a fabric filter apparatus, commonly referred to as a baghouse, which houses fabric filter means upon which at least a portion of the particulate matter in the gas stream traverses the filter means. Typically, the baghouse is comprised of one or more filter chambers housing a plurality of fabric filter bags suspended from a skeletal support system. The particulate matter-laden gas stream enters the baghouse from one end and, under the influence of a fan either disposed upstream or downstream of the baghouse, passes through the filter bags and out the opposite end of the baghouse, with the particulate matter being retained on the upstream side of the filter bags which the gas must traverse as it flows through the baghouse. The gas that is discharged from the baghouse is a relatively particulate matter-free gas stream and vented to the atmosphere.

Continuous operation of such a filter apparatus causes a cake of particulate matter to build up on the upstream surface of the filter bags or other fabric filter means. As this cake of dust builds up on the surface of the filter means, the pressure drop across the filter means increases whereupon it ultimately becomes necessary to effect removable of the filter cake so as not to exceed the pressure-volume capabilities of the flow of inducing fan. Therefore, it has become customary to effect removal of the particulate matter cake building up on the filter means on a periodic basis when the pressure differential or drop across the baghouse has reached a preselected upper limit of desired operating-pressure differential.

In a single chamber collector, it is customary to clean only a portion of the plurality of filter bags housed therein during any given cleaning operation while the remaining filter bags continue to filter the particulate laden gas stream. Typically, when the gas pressure drop between the inlet flange and the outlet flange of the collector has reached the upper limit, the cleaning of a first portion of the filter bags is initiated and continue for a preselected period of time. The clean filter bags are then returned to service and the cleaning of a further portion of the filter bags is initiated. This cleaning sequence is continued either until all filter bags have been cleaned or the pressure drop across the dust collector has reached a preselected lower limit value even though all of the individual filter bags may not have been cleaned in this particular cleaning sequence.

In a typical multiple chamber collector, each individual chamber may be isolated from gas flow independently of the remaining chambers which remain in service. Typically, when the gas pressure drop between the inlet flange and the outlet flange of the collector has reached this upper limit, the cleaning is initiated by isolating one of the chambers of the collector and cleaning that chamber, then sequentially isolating and cleaning each of the remaining chambers until all chambers of the dust collector have been cleaned in fairly rapid succession. Alternately, the cleaning process may be terminated at a predesignated lower limit value on pressure drop across the dust collector even though all of the individual chambers may not have been cleaned in that particular cleaning sequence.

In either case, there is a significant decrease in pressure drop across the dust collector from the initiation of the cleaning sequence to termination of the cleaning sequence. Normally, there is also a decrease in pressure drop across the dust collector as a result of each of the individual cleaning steps in the cleaning sequence. However, it is possible for the pressure drop across the dust collector to have significantly decreased over the cleaning sequence, even though the pressure drop may have even increased during one or more of the cleaning steps forming the cleaning sequence due to a malfunction in the cleaning process.

That is, even though the pressure drop across the dust collector may have decreased to a lower pressure drop after completion of the entire cleaning sequence, it is possible that a certain portion of the filter bags or one particular chamber may not have been effectively cleaned during a cleaning step in the cleaning sequence. In the typical prior art system, the operator would have no way of knowing that a portion of the filter bags or one particular chamber was experiencing an overload due to ineffective cleaning. The operator would continue operation of the collector unaware of the overload because the pressure drop across the dust collector would have decreased over the entire cleaning squence despite one or two ineffective steps in the sequence. Continued operation in an overload condition would most likely result in damage to the overloaded filter bags.

SUMMARY OF THE INVENTION

It is an object of the present invention to provide a means for detecting the overloading of any portion of the filter bags of a single chamber collector or of any chamber of a multiple chamber collector due to ineffective cleaning.

This and other objects of the present invention are achieved by detecting the occurrence of an increase in pressure drop between the initiation of any individual step of the cleaning sequence to the termination of that step. In accordance with the invention, the pressure drop across the dust collector is continuously monitored with the level of pressure drop across the dust collector at the initiation of an individual step in the cleaning sequence stored and compared with the level of pressure drop across the dust collector at the termination of that cleaning step. If the level of pressure drop across the dust collector at the termination of a cleaning step exceeds the level of pressure drop across the dust collector at initiation of that cleaning step, an alarm is activated to warn the operator of the existence of the overload condition so that remedial action may be taken.

BRIEF DESCRIPTION OF THE DRAWINGS

The present invention is described in greater detail hereinafter, with reference to the accompanying drawing, wherein.

DESCRIPTION OF THE PREFERRED EMBODIMENT

Figure 1:
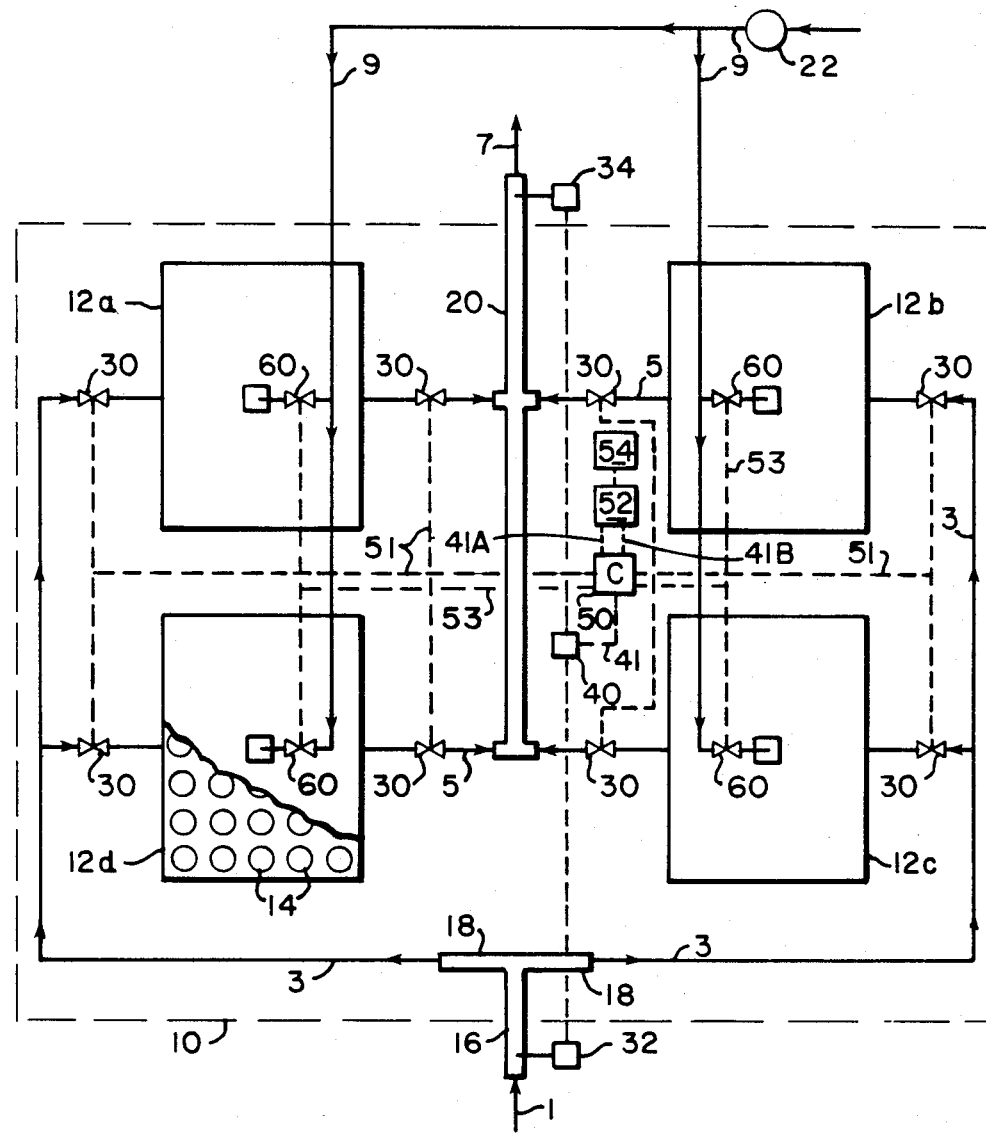
FIG. 1 is a schematic diagram illustrating the application of the overload protection method of the present invention to a multiple chamber fabric filter dust collector.

Referring now to the drawing, and particularly FIG. 1, there is depicted therein a fabric filter dust collector 10 housing a multiplicity of filter chambers 12 each of which houses a plurality of rows of filter bags 14. The dirty gas stream 1 to be cleaned is passed to the fabric filter dust collector 10 under the influence of an induced or forced draft fan (not shown) through gas inlet duct 16. The dirty gas stream 1 entering though the inlet duct 16 is split into a plurality of substreams 3 which pass through a multiplicity of inlet ducts 18 to each of the individual filter chambers 12. Each of the dirty gas substreams 3 upon entering the individual filter chambers 12 traverse the fabric filter means 14 disposed therein and leave the individual fabric filter chambers 12 as clean gas substreams 5. The clean gas substreams 5 are then recombined to form a single clean gas stream 7 which passes from the filter housing 10 to the atmosphere through outlet duct 20.

As the dirty gas substreams 3 traverse the filter means 14 in each of the individual filter chambers 12, the gas penetrates through the filter means 14 while the dust entrained in the dirty gas substreams deposits on the upstream surface of the filter means 14 and is thereby removed from the gas stream and collected as a filter cake on the upstream surface of the filter means 14. As this filter cake builds up in thickness, the resistance to gas flow through the filter means increases. As a result of this increase and resistance to gas flow, the pressure drop across the dust collector 10, i.e., the difference in the pressure of the dirty gas stream 1 entering the dust collector and the pressure of the cleaning gas stream 7 leaving the dust collector, increases. Ultimately, the increase in the flow resistance causes the pressure drop to rise to such a level that it becomes necessary to clean the filter means 14 to remove the filter cake or at least a substantial portion thereof in order to continue operation of the dust collector 10.

In order to clean the filter means, i.e., to remove the filter cake deposited upon the upstream surface of the filter means, a flow of cleaning gas 9 is passed to the individual filter chambers 12 under the influence of fan 22 to flow in a reverse direction back through the filter means 14. As the cleaning gas flows in a reverse direction through the filter means 14 from the downstream side of the filter means 14 to the upstream side of the filter means 14, the filter cake becomes dislodged and drops in pieces to a hopper in the bottom of the filter chamber housing 12. Although a reverse gas flow type of cleaning system is illustrated in FIG. 1, it is to be understood that the present invention contemplates the use of other cleaning schemes such as physically shaking the filter means to loosen the filter cake or passing a pulse of pressurized cleaning gas through the filter means so as to vibrate the filter means and thereby dislodge the filter cake.

In the reverse gas-flow type cleaning process, it is required that the normal flow of dirty gas be terminated in the filter chamber to be cleaned during the cleaning operation. However, it is also desirable to maintain the dust collector 10 in operation continuously. Therefore, a plurality of isolation valves or dampers 30 are provided in the gas supply ducts 3 and gas discharge ducts 5 immediately upstream and downstream of each of the individual filter chambers 12. This enables any one of the filter chambers 12 to be isolated by closing the isolation valves or dampers 30 associated therewith so that the dirty gas flow 1 is diverted and distributed amongst the remaining filter chambers 12 which remain in operation with their respective isolation valves or dampers 30 open.

The typical cleaning process is controlled in response to the pressure drop across the duct collector 10. A first pressure-sensing means 32 is typically provided in the dirty gas inlet 16 at a location upstream of the subdivision of the particulate matter-laden gas stream 1 into a plurality of substreams 3. The pressure-sensing means 32 continuously senses the gas pressure at the inlet to the dust collector 10. A second pressure-sensing means 34 is typically provided in the clean gas outlet duct 20 at a location downstream of the recombination of the clean gas substreams 5 into the relatively particulate matter-free gas stream 7. The second pressure-sensing means 34 continuously senses the gas pressure at the outlet of the dust collector 10.

The pressures sensed by the first and second pressure sensing means 32 and 34 are continuously transmitted to a pressure comparison means 40 wherein the pressure drop, i.e. the pressure differential between the dirty gas stream 1 at the inlet to the dust collector 10 and the clean gas stream 7 at the outlet of the dust collector 10, is continuously measured and compared to a set point pressure drop. The set point pressure drop is preselected by the operator and corresponds to the upper limit of desired gas pressure differential.

Whenever the measured pressure drop across the dust collector 10 reaches the preselected upper limit of pressure drop, i.e. the set point, an activation signal 41 is transmitted to a control means 50 for controlling the operation of the cleaning system. Upon receipt of the actuation signal 41 from the pressure comparison means 40, and in response thereto, the cleaning system control means 50 transmits a first control signal 51 to each of the isolation valves 30 associated with one of the individual filter chambers 12 to isolate that chamber from the flow of dirty gas thereto. Additionally, the cleaning system control means 50 transmits a second control signal 53 to a cleaning gas flow valve 60 operatively associated with the isolation filter chamber to open the valve 60 and initiate the flow of cleaning gases thereto.

After a predetermined period of time calculated to insure proper cleaning, the cleaning gas flow valve 60 is closed and isolation valves 30 are opened to return the previously isolated and now clean filter chamber to service. Thereafter, the flow of dirty gas is maintained to all of the individual filter chambers 12 without further cleaning of any of the filter means until the sensed gas pressure drop across the dust collector 10 again reaches the preselected upper limit of desired gas pressure differential. Thereupon, the cleaning process is again initiated but this time in a second of the individual filter chambers. The cleaning process will continue in this manner with the filter chambers 12 each being cleaned in turn in a rotating sequence with, in accordance with the present invention, the gas pressure drop being allowed to reach the upper limit of desired pressure drop during interval between each sequential cleaning operation.

Figure 2:
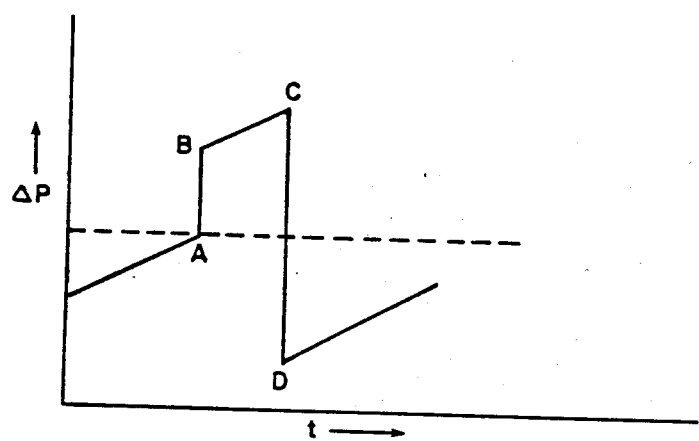
FIG. 2 is a graphical illustration of the pressure drop history during the cleaning of a chamber of the collector of FIG. 1.

Referring now to FIG. 2 which is illustrative of the pressure drop profile history typically experienced over one cleaning step of the cleaning process. The cleaning operation would be initiated for the first time at point A when the pressure drop across the dust collector reaches the set point pressure drop value. Pressure comparison means 40 would then transmit an activation signal 41 to control means 50 for controlling the operation of the cleaning system. In response thereto, control means 50 would transmit a first control signal 51 to each of the isolation valves 30 associated with filter chamber 12a to isolate filter chamber 12a. Additionally, control means 50 would transmit a second signal 53 to the cleaning gas valve 60 associated with the isolated filter chamber 12a to open valve 60 and initiate the flow of cleaning gas therethrough. Upon the closing of the isolation valves 30 associated with the filter chamber 12a, the dirty gas flow would be diverted and redistributed amongst the remaining operating filter chambers 12b, 12c and 12d which would cause the pressure drop across the dust collector to rise to point B. The flow of cleaning gas through chamber 12a would be continued for a predetermined time period believed sufficient to insure proper cleaning of the filter means 14 housed within the chamber 12a. During this period, the pressure drop across the collector would rise to point C as dust continues to deposit on the filter means 14 housed in the remaining filter chambers 12b, 12c and 12d. At the end of the predetermined cleaning time period, control means 50 would transmit a control signal to close the clean gas valve 60 associated with the isolated filter chamber 12a and open the isolation valves 30 associated therewith to reestablish the flow of dirty gas therethrough. When the now clean filter chamber 12a is brought back in service, the pressure drop across the dust collector will drop to point D.

The filter chamber 12a now being in a clean condition rather than in the dirty condition it was in prior to cleaning, the pressure drop across the dust collector 10 would typically have dropped from the set point value at point A to a level somewhat below the set point at point D. However, if there was a malfunction of the cleaning process for any of a number of reasons, the pressure drop across the dust collector 10 could very well be at a level somewhat above point A, i.e. the precleaning pressure drop level, when the chamber 12a is brought back into service. If such occurred in the prior art, the operator would be unaware of it and the cleaning process would continue on to the next steps, i.e. the cleaning of chamber 12b, then 12c and so on. Filter chamber 12a would remain in service, even though a potentially damaging pressure drop exists, until chamber 12a came up for cleaning again in the rotating cleaning sequence.

In accordance with the present invention, an alarm 54 would be actuated whenever the pressure drop existing after a particular cleaning step exceeds the pressure drop across the collector which existed prior to the initiation of that cleaning step. In operation, control means 50 would transmit a first signal 41a, indicative of the pressure drop across the collector 10 at initiation of the cleaning of a chamber, to alarm actuation means 52 and also a second signal 41b, received from the pressure comparison means 40 and indicative of the pressure drop across the collector 10 when the cleaned chamber is returned to service after completion of the cleaning step, to alarm actuation means.

The first signal 41a will be stored by the alarm actuation means 52. Upon receipt of the second signal 41b, the alarm actuation means 52 will compare signal 41b, indicative of the post-cleaning pressure drop (point D in FIG. 2) to the stored signal 41a, indicative of the pre-cleaning pressure drop (point A in FIG. 2). If signal 41b does not exceed signal 41a in magnitude, no alarm is actuated. If, however, signal 41b does exceed signal 41a, thereby indicating a malfunction of the cleaning process and the existence of an excessive pressure drop due to same, alarm actuation means 52 will send a signal to alarm 54 actuating alarm 54 so as to alert the operator of the malfunction of the cleaning step just completed whereby the operator may manually isolate that chamber for inspection or take whatever other action deemed appropriate.

Although described and illustrated herein in relation to a cleaning system employing reversed gas flow as the means for cleaning the filter means housed in the filter chambers, the process of the present invention contemplates the use of any other conventional cleaning means adaptable for use and combination with the process of the present invention such as means for physically shaking the filter means to dislodge the filter cake therefrom and means for introducing pulses of high pressure cleaning gas to vibrate the filter cake from the filter means.

I claim:

1. In a method of filtering particulate matter from a particulate matter-laden gas stream wherein the particulate matter-laden gas stream is passed through a fabric filter collection apparatus comprised of a plurality of independent, isolatable filter chamber each housing fabric filter means upon which a portion of the particulate matter deposits, the particulate matter-laden gas stream being subdivided upstream of the collection apparatus into a like plurality of substreams each of which is passed through one of said plurality of independent, isolatable filter chambers prior to recombining said substreams downstream of said collection apparatus to form a relatively particulate matter-free gas stream, an improved method of sequentially cleaning said plurality of filter chambers of deposited particulate matter comprising:

a. continuously sensing the gas pressure differential across the dust collector between a point upstream of the subdivision of the particulate matter-laden gas stream into a plurality of substreams and a point downstream of the recombination of said substreams into the relatively particulate matter-free gas stream;

b. isolating one of said plurality of filter chambers from gas flow and diverting the substream flowing thereto amongst the remaining filter chambers of said plurality of filter chambers;

c. thence cleaning the particulate matter depositing upon the fabric filter means disposed within said isolated filter chamber;

d. thence returning said cleaned filter chamber to service by reestablishing gas flow therethrough;

e. comparing the gas pressure differential across the dust collector sensed at the initiation of step (b) to the gas pressure differential across the dust collector sensed at the completion of step (d); and f. whenever the gas-pressure differential across the dust collector sensed at the completion of step (d) exceeds that sensed at the initiation of step (b), actuating an alarm indicating a malfunction of the cleaning process.

2. A method as recited in claim 1 wherein the step of cleaning the particulate matter collecting upon the fabric filter means comprises shaking the fabric filter means so as to cause the particulate matter collecting thereupon to dislodge.

3. A method as recited in claim 1 wherein the step of cleaning the particulate matter depositing upon the fabric filter means comprises passing a flow of cleaning gas through the filter means in a direction opposite to the direction of the flow of the particulate matter-laden gas therethrough thereby causing the particulate matter depositing thereupon to dislodge.

* * * * *